Patented May 24, 1949

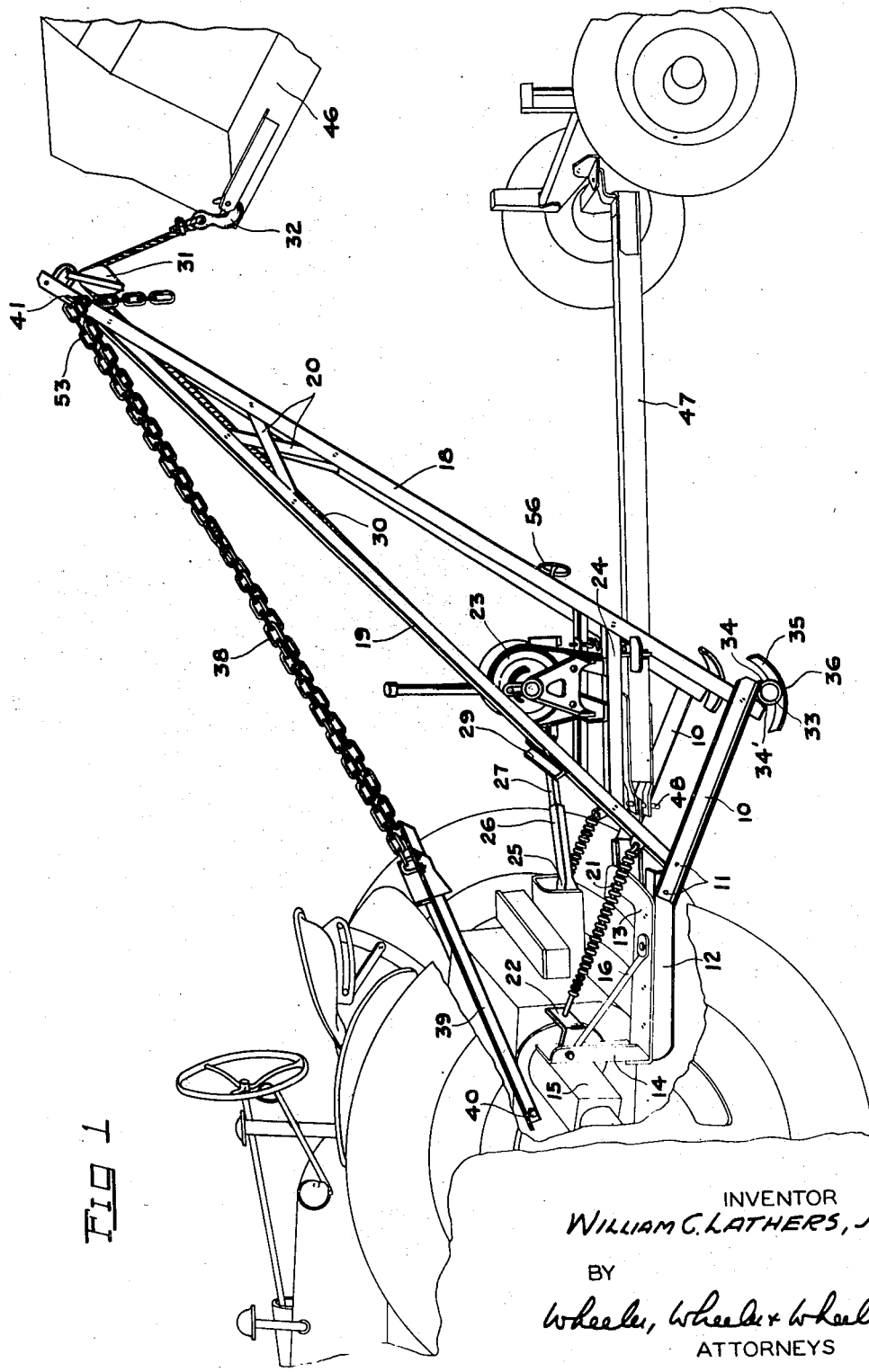

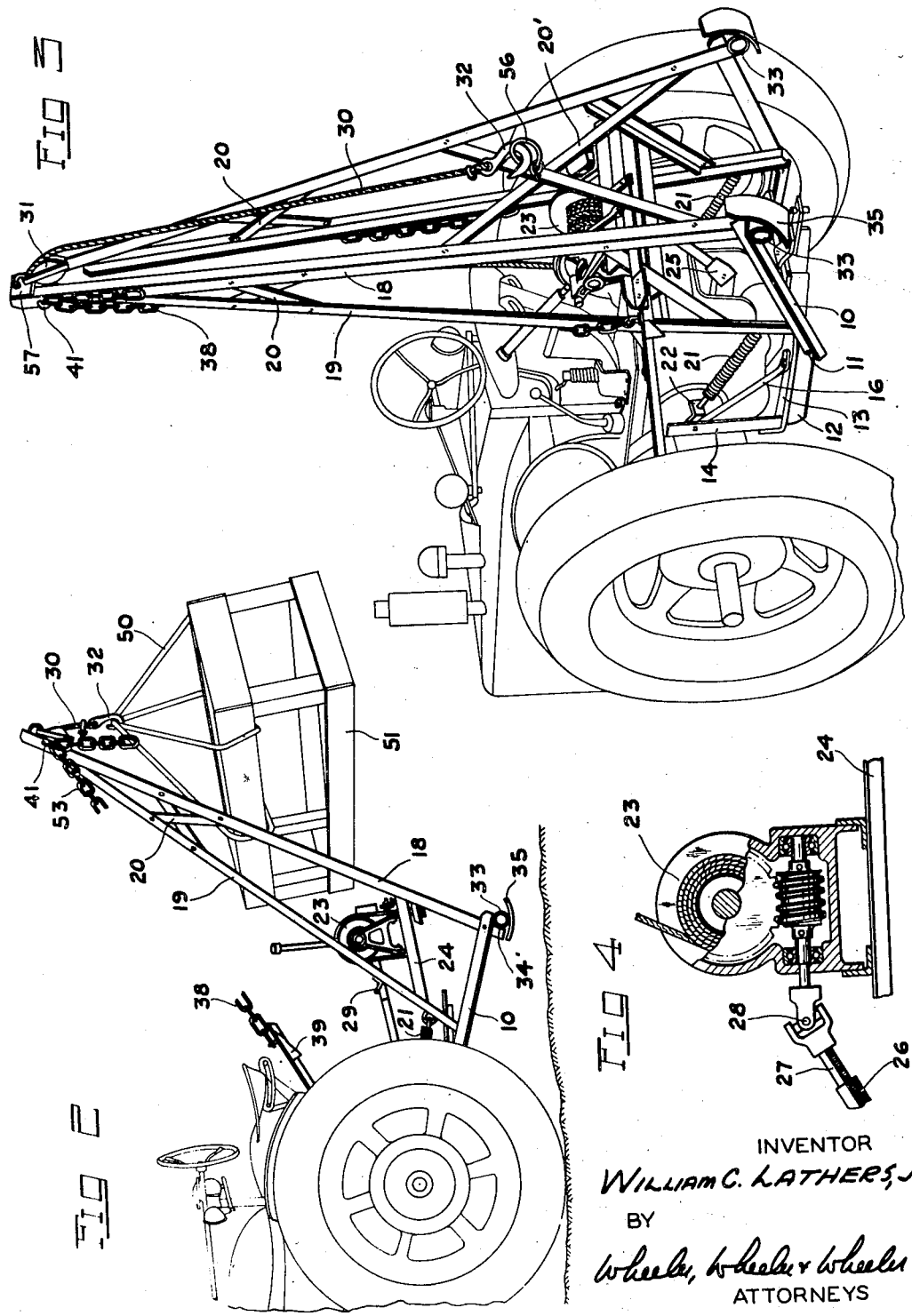

2,470,857

UNITED STATES PATENT OFFICE 2,470,857

HOISTING ATTACHMENT FOR MOTOR-DRIVEN VEHICLES, SUCH AS TRACTORS

William C. Lathers, Jr., Madison, Wis.

Application January 13, 1947, Serial No. 721,860

11 Claims. (Cl. 214—86)

This invention relates to improvements in hoisting attachments for motor driven vehicles, such as tractors.

One object of my invention is to provide a hoisting attachment which may be so connected with a motor driven vehicle that it can be tilted and fulcrumed upon the ground at a substantial distance in the rear of such vehicle and the entire weight of the vehicle utilized with effective leverage to hold the attachment in a tilted hoisting position.

Another object is to provide means whereby a hoisting attachment may be supported from a motor driven vehicle such as a tractor, either out of contact with the ground in a tilted hoisting and load transporting position or in a stationary hoisting position, with the attachment fulcrumed on the ground in the rear of the vehicle to which it is attached.

A further object is to provide a hoisting attachment for a motor driven vehicle which will be operative under power derived from the vehicle in three different positions, i. e., in a raised vertical position, unloaded or lightly loaded—or in a raised inclined position for lifting and carrying a bulky load—or in a stationary position while fulcrumed on the ground in the rear of the vehicle to which it is attached.

A further object is to provide means for pivotally mounting a hoisting attachment on the frame of a motor driven vehicle for swinging movements in a vertical plane of the line of travel and providing additional flexible connections for predetermining and limiting its swinging movements on said pivotal connections.

In the following description, reference is had to the accompanying drawings, in which Figure 1 is a perspective view of my improved hoist as it appears when fulcrumed on the ground in the rear of a tractor, and used for lifting a heavy load, with power derived from the tractor engine.

Figure 2 is a side elevation showing the hoist in a partially raised position, and utilized by the tractor for carrying a bulky load.

Figure 3 is a perspective view of the tractor with the hoist raised to a vertical position, the perspective being taken from a point of view more to the rear than in Figure 1.

Figure 4 is a detail sectional view of the driving connections of the winding drum.

Like parts are identified by the same reference characters throughout the several views.

A derrick-like frame has base bars 10, each pivotally connected at 11 to an angle iron support 12, one flange of which is welded, bolted, or riveted to a draw bar assembly with which ordinary tractors are usually equipped, and which is illustrated in the drawings as comprising a bar 13 having upright portions 14 connected with the axle housing 15 and with the member 13 by braces 16. The draw bar and its connection with the tractor may be of any ordinary construction, and the angle bar 12 merely provides a convenient means for attaching a pivotally connected derrick thereto.

The derrick has a pair of uprights 18, the lower end portions of which are secured to the outer ends of the bars 10. Their upper end portions are also connected with the bars 10 by a set of braces 19 which are cross braced with the uprights 18 as indicated at 20 and 20'. Near their lower ends the brace bars 19 are connected by coiled tension springs 21 with brackets 22, welded or otherwise secured to the portions 14 of the draw bar assembly.

A winding drum or winch 23 is mounted in the derrick on a set of frame bars 24 and is driven from the tractor motor by a shaft having a universal joint connection at 25 with one of the motor driven shafts of the tractor. The telescopic shaft sections 26 and 27 preferably have their telescopic portions square in cross section and the section 27 has worm and worm wheel connection at 28 with the winding drum 23, as best shown in Figure 4. The braces 19 are cross connected by an angle bar 29 adjacent the winding drum for additional rigidity. A hoisting cable 30 is wound upon the drum 23 and extends over a tackle pulley 31 at the upper end of the derrick, and is provided with means such as the hook 32 for engagement with the article to be lifted.

The upright bars 18 extend below the base bars 10, and connecting members 33, preferably cylindrical in form, are each welded to one of the bars 10 at 34 and to the downwardly projecting portion of the associated bar 18 at 34'. An arcuate supporting shoe 35 is welded to the connecting member 33 at 36. But any means for fixedly connecting the shoes 35 to the outer corners of the derrick may be substituted.

At their upper ends each of the bars 18 is connected with the tractor frame by chains 38 and link bars 39, each pivoted to one side of the tractor frame or body as indicated at 40. The lower end of each chain may be permanently linked to the rear end of its associated link bar 39, and one of the chain links, near the upper end of the chain, is detachably connected with the associated upright 18 by a hook 41.

When the derrick is in an inclined position (Figure 1 or Figure 2), the effective length of these chains determines the extent to which the derrick may be tilted. The effective length of the chains may be varied by connecting different chain links with the hooks 41.

If the base of the derrick is pivotally connected with a rigid portion of the tractor, and the derrick tilted to a position with the shoes 33 fulcrumed on the ground, a load applied to the hoisting tackle tends to lift the rear end of the tractor, but the chains 38, being connected to the tractor at a point remote from the pivotal connection of the derrick, converts this tendency into a lifting pull on the entire tractor. Therefore, the entire weight of the tractor serves as a counterpoise for the load imposed on the cable 30. If the part of the tractor to which the derrick is pivotally connected at 11 is not sufficiently rigid for this purpose, the links 39 should be connected with the tractor body or frame far enough in front of the rear axle to exert their pull upon the front end of the tractor while the pivot pins 11 are tending to lift its rear end.

In Figure 1 the hook 32 is illustrated as connected with the body 46 of a dumping truck having a tongue 47 connected with the draw bar 13 of the tractor at 48. In Figure 2 the hook 32 is shown in engagement with cables or ropes 50 connected with a crate 51 which is being transported by the tractor. In this view the chains 38 have links 53 connected with the hook 41 and the derrick is thus supported with its fulcrum shoes 35 above the level of the ground, whereby the crate 51, or any other bulky object, may be transported by the tractor while the derrick is suspended in the indicated raised position.

When the derrick is not loaded, it may be held in a vertical position by the springs 21, and its hoisting hook 32 may be engaged with the derrick at any suitable point, such as a ring 56 at the crossing points of the bracing 21.

When the derrick is not in use, or when its hoisting hook 32 is connected with a light, non-bulky load, it may be held by the springs 21 in the vertical position, with its brace bars 19 in contact with a cross bar 57 which connects the outer ends of the links 39 and serves as a stop. When it is adjusted for transporting loads, particularly bulky loads, it is adjusted to the intermediate inclined position in which it is shown in Figure 2 and is held in that position by the shortened chains 38 and the springs 21, the latter being distended to a greater extent than they are when the derrick is in the Figure 3 position. When the tractor and derrick are at rest, with the chain links 58 connected with the hooks 41, the derrick may be tilted until the shoes 35 are in contact with the ground. In this position the winch can lift a maximum load, since the shoes operate as fulcrums, with the entire weight and leverage of the vehicle serving to counterpoise the load or resistance encountered by the hoisting mechanism.

To disconnect the derrick from the vehicle it is merely necessary to remove the pivot bolts 11, and disconnect the springs 21, the chains 38, and the winch actuating shaft.

Any connection, the effective length of which can be varied to link the upper end of the derrick to the tractor, may be employed if of sufficient strength to limit the tilting movement of the derrick to the desired load carrying position. It may have any point of connection with the tractor body if the pivotal connection of the lower portion of the derrick is made with a substantially rigid portion of the tractor. But if the load to be carried is greater than the rear end of the tractor can support, the upper portion of the derrick should be connected with the tractor body in front of its rear axle as indicated in the drawings.

I claim:

1. The combination with a motor driven vehicle having means for connecting its motor with other mechanism, of a derrick pivotally connected with the rear end of the vehicle and provided with a winding drum and tackle, extensible shafting for connecting the vehicle motor with the winding drum, and means for adjustably connecting the upper end of the derrick with said vehicle in different positions for lifting loads of different weights.

2. A combination as set forth in claim 1, in which the rear corners of the derrick are provided with shoes adapted to rest upon the ground when said adjustable connections are extended to allow the derrick to swing upon its pivotal connections to the extreme tilted operative position of a plurality of tilted operative positions.

3. A combination as set forth in claim 1, in which portions of the derrick, intermediate of its ends, are connected with the vehicle by springs urging the derrick toward a raised upright position and having sufficient tension to hold it in that position when unloaded.

4. A combination as set forth in claim 1, in which the adjustable connecting means comprises a set of chains connecting the upper end of the derrick with the vehicle at points remote from its pivotal connection, said chains having a plurality of links each adapted to serve as an effective end of the chain, whereby its length may be varied to suit derrick tilting requirements.

5. A motor driven vehicle having a derrick pivotally connected with its rear end, means connected with the vehicle in front of its rear axle for supporting the derrick in various positions of upright and tilted adjustment, a winch and tackle carried by the derrick, and means for utilizing the power of the vehicle motor to actuate the winch.

6. A motor driven vehicle having a derrick pivotally connected with its rear end, means connected with the vehicle in front of its rear axle for supporting the derrick in various positions of upright and tilted adjustment, a winch and tackle carried by the derrick, and means for utilizing the power of the vehicle motor to actuate the winch, said derrick having shoes at its rear corners adapted to fulcrum on the ground when the derrick is in an extreme rearwardly tilted position.

7. The combination with a motor driven vehicle, of a derrick having its lower end pivotally connected with the vehicle and its upper portion linked thereto, tension springs connecting an intermediate portion of the derrick with the vehicle, hoisting mechanism mounted on the derrick and having extensible driving connections with the vehicle motor, and means for adjusting the link connections with the upper portion of the derrick with the vehicle to hold the derrick in various positions out of contact with the ground and in one position with two of its lower corners in contact with the ground.

8. A derrick provided with hoisting mechanism, in combination with means for pivotally connecting two of the lower corners of the derrick with a motor driven vehicle, means for adjustably connecting the upper end of the derrick with said vehicle at points remote from said pivotal connections, and extensible power shafting for connecting a hoisting mechanism with the vehicle motor, whereby said hoisting mechanism may be operated with the derrick in various tilted positions with a load suspended from its upper end and the entire vehicle acting as a counterpoise.

9. A derrick having its lower end provided with means for pivotally connecting it with a motor driven vehicle, in combination with means for connecting its upper end with said vehicle in various positions of tilting adjustment in and out of contact with the ground for handling loads of different weights, and hoisting mechanism mounted on the derrick and provided with means for utilizing the vehicle motor to operate such mechanism in various tilted positions of the derrick.

10. A derrick as set forth in claim 9, provided with tension springs for resiliently connecting it with the vehicle and urging it toward an upright position out of contact with the ground when lightly loaded and when unloaded.

11. Hoisting mechanism provided with means for pivotally connecting its lower portions with a motor driven vehicle and extensible linkage for connecting its upper portion with said vehicle, and means for utilizing the vehicle motor to operate the hoisting mechanism in various positions of adjustment about the axis of its pivotal connection.

WILLIAM C. LATHERS, JR.

REFERENCES CITED

The following references are of record in the file of this patent:

UNITED STATES PATENTS

| Number | Name | Date |
|---|---|---|
| 990,513 | Bathrick | Apr. 25, 1911 |
| 1,630,800 | Page | May 31, 1927 |
| 1,725,952 | Beebe | Aug. 27, 1929 |
| 1,790,243 | Nilson | Jan. 27, 1931 |
| 1,841,525 | Evensen | Jan. 19, 1932 |
| 1,981,308 | Copley | Nov. 20, 1934 |
| 2,251,595 | Messman | Aug. 5, 1941 |
| 2,327,461 | Rowe | Aug. 24, 1943 |
| 2,346,404 | Thwaites | Apr. 11, 1944 |